C. L. KASSON.
AUTOMATIC TIMING DEVICE.
APPLICATION FILED SEPT. 11, 1918.
1,332,844.
Patented Mar. 2, 1920.
2 SHEETS—SHEET 1.
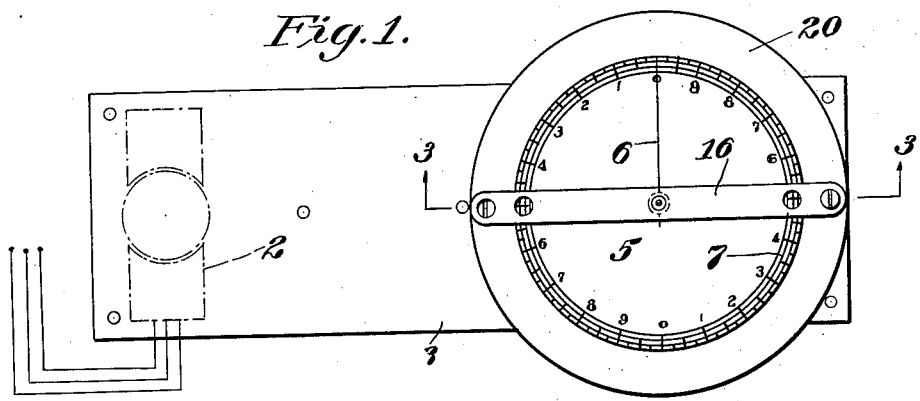
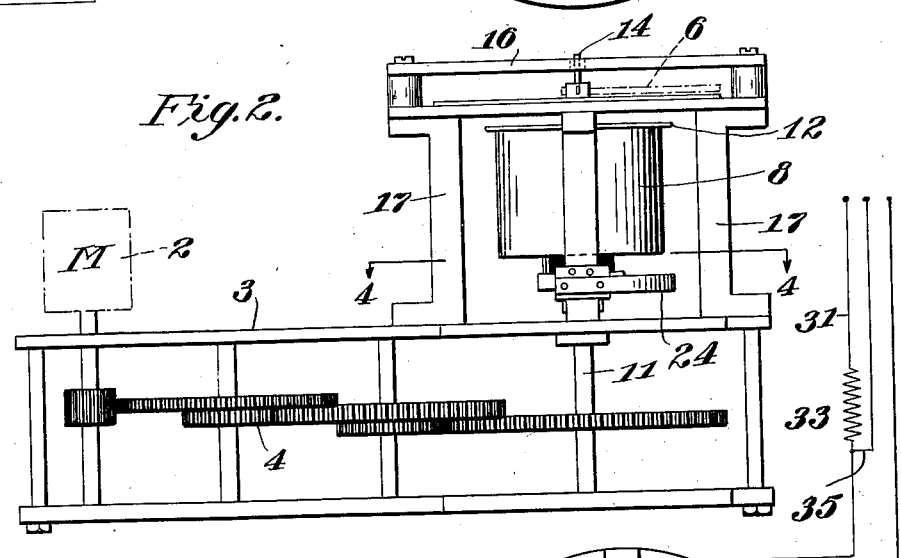
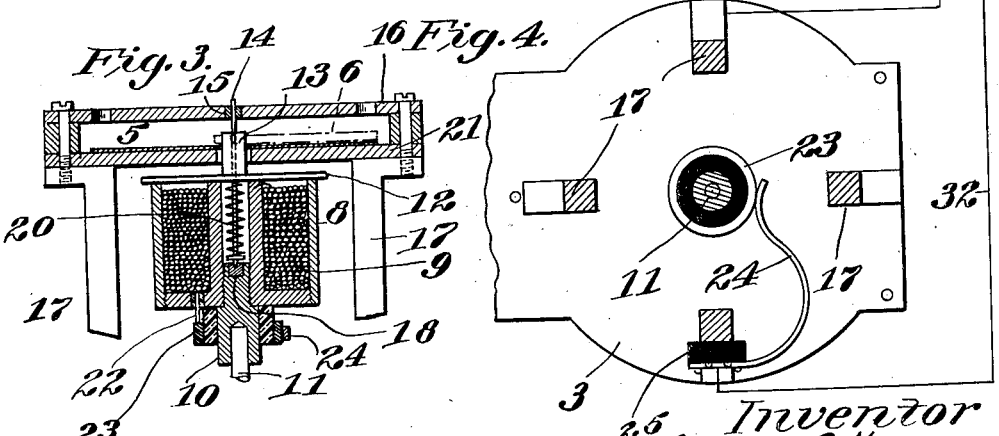
Inventor
Charles L. Kasson
by James R. Hodder
Attorney

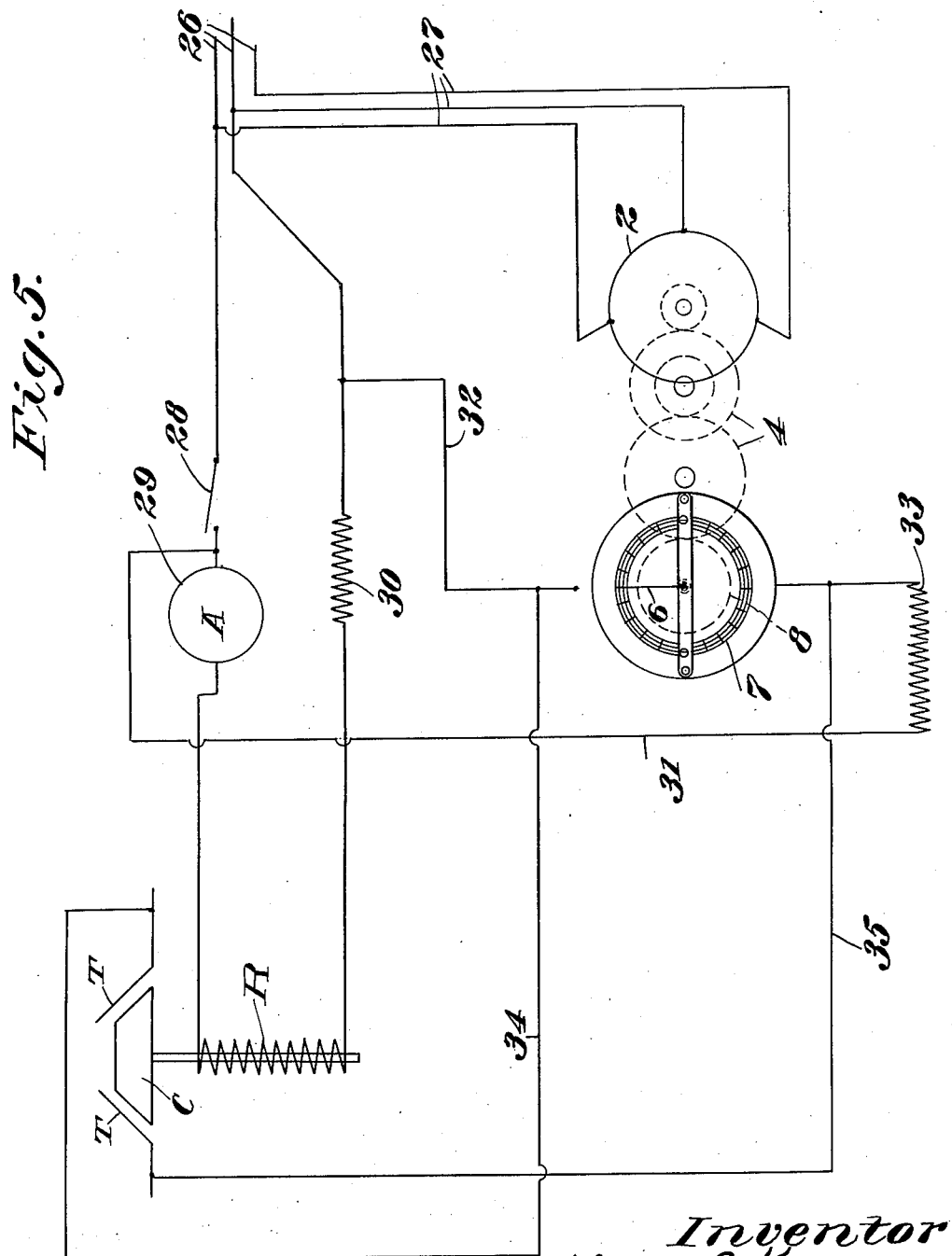

UNITED STATES PATENT OFFICE.

CHARLES L. KASSON, OF MATTAPAN, MASSACHUSETTS.

AUTOMATIC TIMING DEVICE.

1,332,844.  Specification of Letters Patent.  Patented Mar. 2, 1920.

Application filed September 11, 1918. Serial No. 253,538.

*To all whom it may concern:*

Be it known that I, CHARLES L. KASSON, a citizen of the United States, residing at Mattapan, Massachusetts, have invented an Improvement in Automatic Timing Devices, of which the following description, in connection with the accompanying drawings, is a specification, like letters on the drawings representing like parts.

This invention relates to apparatus for measuring short intervals of time such, for instance, as periods of from one twenty-fifth of a second to one or two seconds. The invention will be herein disclosed as embodied in an apparatus designed particularly for use in measuring the time settings of electrical relays and the like although it may also be used for many other purposes.

It is essential to the proper operation of much electrical apparatus to adjust accurately the time interval that elapses between the initiation of some change in the operation or condition of the apparatus and some subsequent change in such condition or operation. For instance, it is very frequently desirable to determine the interval between the closing of a relay circuit and the completion of the movement of the part operated by the relay. The present invention provides a simple form of apparatus by means of which these time intervals can be conveniently and accurately measured.

The nature of the invention will be readily understood from the following description and the novel features will be particularly pointed out in the appended claims.

Referring now to the accompanying drawings,

Figure 1 is a plan view, somewhat diagrammatic, of an apparatus embodying the present invention;

Fig. 2 is a side elevation of the apparatus shown in Fig. 3;

Fig. 3 is a vertical cross sectional view on the line 3—3, Fig. 1;

Fig. 4 is a horizontal cross sectional view on the line 4—4, Fig. 2; and

Fig. 5 is a diagram showing one method of using the apparatus.

The apparatus shown comprises a motor 2 capable of running at a substantially constant speed. Preferably a synchronous electric motor is employed. This motor is supported on a suitable frame 3 which houses a train of gearing 4 that is driven by the motor. Supported on this frame is a time indicator 5 comprising a rotatable pointer 6 and a scale 7 over which the pointer swings. This pointer may be connected to or disconnected from the gearing by means of an electrically operated clutch 8.

This clutch comprises a solenoid 9 mounted in a suitable casing threaded securely on a post 10 that is mounted fast on the upper end of a shaft 11 to which also is fixed the last gear in the train. The solenoid thus revolves continuously during the operation of the motor. The clutch also includes a disklike armature 12 mounted at the upper end of the solenoid 9 and having a sleeve 13 fixed centrally thereto which receives a vertical spindle 14. The upper end of this spindle is rotatably mounted in a bushing or bearing 15 set into a brace 16 which is secured to the upper ends of supporting members 17 mounted on the frame 3, and the lower end of the spindle rests in a jewel or other anti-friction bearing 18 set into the top of the post 10, as clearly shown in Fig. 3.

The disk 12 and sleeve 13 can slide up and down longitudinally of the spindle 14 and the pointer 6 is fixed securely to the sleeve 13. A spring 20 encircles the spindle 14 below the disk 12 and normally holds the disk upwardly away from the end of the solenoid and in contact with a plate 21 which is secured to the upper ends of the posts or supports 17. This plate is stationary and consequently the friction between the disk 12 and the plate produced by the pressure of the spring 20 is sufficient to hold the disk against rotation when the solenoid is deënergized. In other words, these parts act as a brake to hold the pointer against rotation when the solenoid is deënergized.

In order to conduct the energizing current to the solenoid one terminal of the solenoid is grounded and the other terminal, indicated at 22, Fig. 3, is led to a slip-ring 23 which encircles the post 10 but is insulated therefrom. A spring contact or brush 24 bears against this slip-ring and is secured to an insulating block 25 that is fastened to one of the supports 27.

It will now be evident that when the solenoid 9 is energized the armature or disk 12 will be immediately pulled down into contact with the upper end of the solenoid and thus establish a driving connection between the motor 2 and the indicator or pointer 6. Since the synchronous motor 2 runs at a substantially constant and known speed it will rotate the pointer 6 over the scale 7 at a substantially constant speed so long as this driving connection between the indicator and motor is maintained. As soon, however, as the solenoid is deënergized the spring 20 will force the disk 12 away from the end of the solenoid and into engagement with the lower face of the stationary plate 21, thus stopping the rotation of the pointer. The range of travel of the disk 12 is very short so that the starting and stopping movements of the indicator are affected through this mechanism substantially instantaneously.

Fig. 5 illustrates one arrangement in which the apparatus above described may be utilized to measure the time of operation or the time setting of a relay indicated diagrammatically at R. This relay is arranged to operate a core carrying a contact C designed to connect or disconnect the trip circuit contacts T. It is desirable to measure the interval of time between the closing of the circuit that energizes the relay R and the closing of the trip contact circuit. The main current supplying conductors or buses are indicated at 26 and conductors 27 carry current from this source of supply to the synchronous motor 2. The operating circuit for the relay R preferably includes a switch 28, an ammeter 29 and a resistance 30, the resistance being designed to limit the flow of current through the relay coil. The solenoid 9 is connected in parallel with the relay R by conductors 31 and 32, a resistance 33 also being included in this circuit to limit the current flow therethrough. It will be seen from an inspection of Fig. 5 that the solenoid circuit is controlled by the switch 28 which also controls the operating circuit for the relay. One of the contacts T is connected by a conductor 34 to one terminal of the solenoid 9 and the other contact is connected by the conductor 35 to the opposite terminal of the solenoid. In other words, the trip circuit contacts T are included in a short circuit for the solenoid.

Assuming the apparatus to be set up as indicated in Fig. 5 and the motor 2 to be in operation, the closing of the switch 28 will energize the relay R and simultaneously will energize the solenoid 9 thus establishing a driving connection between the motor 2 and the indicator or pointer 6 and starting the rotation of the indicator the instant the operating circuit for the relay is energized. This indicator will continue to rotate until the contact C engages the contacts T which instantly short circuits the solenoid, thus deënergizing it, interrupting the driving engagement between the indicator and the motor, and allowing the spring 20 to force the armature 12 into engagement with the plate 21 and stop the rotation of the pointer.

Since the movement of the pointer was started simultaneously with the closing of the operating circuit for the relay and was stopped again simultaneously with the closing of the trip circuit, the distance traveled by the pointer over the scale will indicate the time interval that has elapsed between the closing of these two circuits.

It will now be evident that the invention provides a very simple form of apparatus for measuring these short time intervals which can be economically manufactured and is very convenient to use particularly in measuring the time settings of electrically operated devices.

While I have herein shown and described the best embodiment of the invention of which I am at present aware and one arrangement of apparatus in which this embodiment of the invention may be used, it is obvious that the invention may be embodied in many other forms and that it may be used in a great variety of ways without departing from the spirit or scope of this invention.

What is claimed as new is:—

1. An apparatus for measuring time intervals, comprising a synchronous motor, an indicator, a train of gearing operated by said motor, an electric clutch comprising a part driven by said gearing, a second part connected to said indicator, said parts being relatively movable to establish a driving connection between them or break said connection, and a brake coöperating with said second clutch part to stop its movement as soon as the driving connection between said clutch parts is broken.

2. An apparatus for testing the timing of an electrically operated device comprising a motor, a time indicator, driving connections between said motor and indicator including an electric clutch, an operating circuit for said device connected with said clutch to energize it when said circuit is closed, and a short-circuiting circuit for said clutch arranged to be closed by the operation of said device and thereby to deënergize said clutch.

3. An apparatus for testing the timing of an electrically operated device comprising, a synchronous motor, an indicating device, an electric clutch for connecting the indicating device to the motor, a device to be tested, a circuit, said electric clutch and said last named device being connected in parallel in said circuit, a second circuit in shunt with said electric clutch, and means operated by the device to be tested for closing said second circuit to deënergize the clutch.

4. An apparatus for testing the timing of an electrically operated device comprising, a synchronous motor, an indicating device, an electric clutch interposed between the indicating device and said motor, a brake associated with said clutch and including an element thereof, a device to be tested, a circuit including the electric clutch and said device in parallel, a second circuit in shunt of said clutch, and means operated by said device for completing said second circuit, to deënergize the clutch and simultaneously set the brake.

In testimony whereof I have signed my name to this specification in the presence of two subscribing witnesses.

CHARLES L. KASSON.

Witnesses:
JAMES R. HODDER,
GEO. H. MAXWELL.